US011254758B2

(12) United States Patent
Zuideveld et al.

(10) Patent No.: US 11,254,758 B2
(45) Date of Patent: Feb. 22, 2022

(54) PROCESS FOR PREPARING A PROCATALYST FOR POLYMERIZATION OF OLEFINS

(71) Applicant: SABIC GLOBAL TECHNOLOGIES B.V., Bergen op Zoom (NL)

(72) Inventors: Martin Alexander Zuideveld, Geleen (NL); Aurora Alexandra Batinas-Geurts, Geleen (NL); Dafne Lise Steinfort, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 185 days.

(21) Appl. No.: 16/494,501

(22) PCT Filed: Mar. 16, 2018

(86) PCT No.: PCT/EP2018/056749
§ 371 (c)(1),
(2) Date: Sep. 16, 2019

(87) PCT Pub. No.: WO2018/167305
PCT Pub. Date: Sep. 20, 2018

(65) Prior Publication Data
US 2020/0087426 A1   Mar. 19, 2020

(30) Foreign Application Priority Data
Mar. 17, 2017  (EP) .................................... 17161661

(51) Int. Cl.
*C08F 4/654*   (2006.01)
*C08F 4/651*   (2006.01)
*C08F 10/00*   (2006.01)

(52) U.S. Cl.
CPC ............ *C08F 4/6546* (2013.01); *C08F 4/651* (2013.01); *C08F 10/00* (2013.01); *C08F 2410/01* (2013.01)

(58) Field of Classification Search
CPC ......... C08F 4/6546; C08F 4/651; C08F 10/00
See application file for complete search history.

(56) References Cited

U.S. PATENT DOCUMENTS

| 4,414,132 | A | 11/1983 | Goodall et al. |
| 4,978,648 | A | 12/1990 | Barbe et al. |
| 5,077,357 | A | 12/1991 | Job |
| 5,106,806 | A | 4/1992 | Job |
| 5,556,820 | A | 9/1996 | Funabashi et al. |
| 6,799,568 | B2 | 10/2004 | Zakharov et al. |
| 8,536,372 | B2 | 9/2013 | Chen et al. |
| 2013/0053525 | A1 * | 2/2013 | Gullo ...................... C07C 69/78 526/213 |

FOREIGN PATENT DOCUMENTS

| EP | 1283222 A1 | 2/2003 |
| EP | 1538167 A1 | 6/2005 |
| EP | 1783145 A1 | 5/2007 |
| EP | 2027164 B1 | 8/2012 |
| WO | 9632427 A1 | 10/1996 |
| WO | 9832427 A1 | 7/1998 |
| WO | 2006056338 A1 | 6/2006 |
| WO | 2015081254 A1 | 6/2015 |
| WO | 2015091983 A1 | 6/2015 |
| WO | 2015091984 A1 | 6/2015 |
| WO | 2015185490 A1 | 12/2015 |
| WO | WO-2015185495 A1 * | 12/2015 ............ C08F 110/06 |
| WO | WO-2016116469 A1 * | 7/2016 ................ C07F 7/28 |

OTHER PUBLICATIONS

International Search Report for International Application No. PCT/EP201/056749, International Filing Date Mar. 16, 2018, dated Jun. 28, 2018, 6 pages.
Pullukat, Thomas J. and Hoff, Raymond E., "Silica-Bases Ziegler-Natta Catalystis: A Patent Review", Catal. Rev.-Sci. Eng. 41(3&4), 1999, pp. 389-438.
Written Opinion for International Application No. PCT/EP201/056749, International Filing Date Mar. 16, 2018, dated Jun. 28, 2018, 7 pages.

* cited by examiner

*Primary Examiner* — Catherine S Branch
(74) *Attorney, Agent, or Firm* — Cantor Colburn LLP

(57) ABSTRACT

The present invention relates to a process for preparing a procatalyst for polymerization of olefins, said process comprising contacting a magnesium-containing support with a halogen-containing titanium compound, an internal electron donor being a substituted 1,2-phenylene aromatic diester compound.

15 Claims, No Drawings

PROCESS FOR PREPARING A PROCATALYST FOR POLYMERIZATION OF OLEFINS

CROSS REFERENCE TO RELATED APPLICATIONS

This application is a National Stage application of PCT/EP2018/056749, filed Mar. 16, 2018, which claims the benefit of European Application No. 17161661.8, filed Mar. 17, 2017, both of which are incorporated by reference in their entirety herein.

BACKGROUND

The present invention is related to a process for reducing the transesterification that occurs when a certain internal electron donor (according to Formula A below) is used in a certain process for preparing a procatalyst (comprising steps i)-v) below).

Catalyst systems and their components that are suitable for preparing a polyolefin such as polypropylene are generally known. One type of such catalysts is generally referred to as Ziegler-Natta catalysts. The term "Ziegler-Natta" is known in the art and it typically refers to catalyst systems comprising an organometallic compound (also typically referred to as a co-catalyst); optionally one or more electron donor compounds (e.g. external electron donors); and a transition metal-containing solid catalyst compound (also typically referred to as a procatalyst), comprising a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO98/32427 A1.

An internal electron donor is known being a substituted 1,2-phenylene aromatic diester compound according to Formula A,

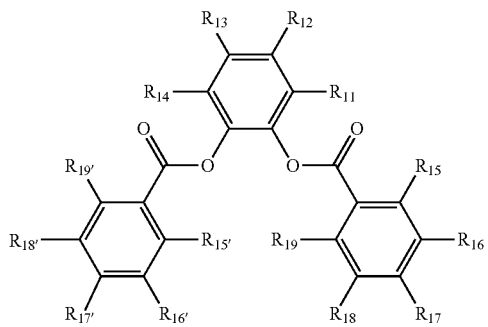

Formula A wherein in Formula A $R^{11}$, $R^{12}$, $R^{13}$, $R^{14}$, $R^{15}$, $R^{15'}$, $R^{16}$, $R^{16'}$, $R^{17}$, $R^{17'}$, $R^{18}$, $R^{18'}$, $R^{19}$, and $R^{19'}$ are the same or different; and wherein each of these R-groups is independently selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; and on the proviso that not all of R-groups may be hydrogen. More information and embodiments regarding this donor can be found in U.S. Pat. No. 8,288,585 B2, in column 2 lines 25-34; this section (these sections) are incorporated by reference.

When such a donor is used in a process to prepare a procatalyst as disclosed in EP1838741B1—a transesterification occurs leading to an decrease in the amount of internal donor that is incorporated into the procatalyst, which is not desirable. A possible solution is to add a larger amount of said internal donor during the process but this is not advantageous due to larger amounts of transesterification contaminants as well as increased costs.

It is an aim of the present inventors to provide a process for preparing a procatalyst using the internal donor according to formula A with reduced transesterification and hence with increased internal donor content.

SUMMARY

The present invention provides a process for preparing a procatalyst using the internal donor according to formula A with reduced transesterification and hence with increased internal donor content.

In a first aspect the present invention relates to the removal of ethoxide by a step of washing the support prior to the addition of the internal electron donor according to Formula A. In said first aspect the present invention relates to a process according to claim 1.

In a second aspect the present invention relates to the addition the internal electron donor according to Formula A and optionally the activator and reacting the resulting mixture at a lowered temperature. In said first aspect the present invention relates to a process according to claim 2.

In a third aspect the present invention relates to the addition the internal electron donor according to Formula A and optionally the activator at a lowered temperature and reacting the resulting reaction mixture. In said first aspect the present invention relates to a process according to claim 3.

In a fourth aspect, the first and second aspects are combined, being that ethoxide is removed by a step of washing the support prior to the addition of the internal electron donor according to Formula A which internal electron donor according to Formula A and the activator are added at a lowered temperature. In said first aspect the present invention relates to a process according to clause 4.

In a fifth aspect, the first and third aspects are combined, being that ethoxide is removed by a step of washing the support prior to the addition of the internal electron donor according to Formula A which internal electron donor according to Formula A is added at a lowered temperature. In said first aspect the present invention relates to a process according to clause 5.

In a sixth aspect, the second and third aspects are combined, viz. related to the addition of the internal electron donor according to Formula A and optionally the activator at a lowered temperature and reaction of the resulting mixture at a lowered temperature. In said first aspect the present invention relates to a process according to clause 6.

In a seventh aspect, the first, second and third aspects are combined, viz. removal of ethoxide by as step of washing the support prior to the addition of the internal electron donor according to Formula A which is (optionally with the activator) added at a lowered temperature and reaction of the resulting mixture at a lowered temperature. In said first aspect the present invention relates to a process according to clause 7.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises Ziegler-Natta catalytic species supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N).

"external donor" or "external electron donor" or "ED" as used in the present description means: an electron-donating compound used as a reactant in the polymerisation of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" and "catalyst component" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—).

"Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si. Thus a heteroatom also includes halides.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. An alkyl group also encloses aralkyl groups wherein one or more hydrogen atoms of the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"alkoxide" or "alkoxy" as used in the present description means: a functional group or side-chain obtained from an alkyl alcohol. It consists of an alkyl bonded to a negatively charged oxygen atom.

"aryloxide" or "aryloxy" or "phenoxide" as used in the present description means: a functional group or side-chain obtained from an aryl alcohol. It consists of an aryl bonded to a negatively charged oxygen atom.

"Grignard reagent" or "Grignard compound" as used in the present description means: a compound or a mixture of compounds of formula R4zMgX42-z (R4, z, and X4 are as defined below) or it may be a complex having more Mg clusters, e.g. R4Mg3Cl2.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of procatalyst consumed in the polymerization reactor per hour, unless stated otherwise.

"MFI" or "Melt Flow index" as used in the present description is measured at a temperature of 230° C. with 2.16 kg load and measured according to ISO 1133:2005. Melt Flow Rate (MFR) is used interchangeably with MFI in the present description.

"bulk density" as used in the present description means: the weight per unit volume of a material, including voids inherent in the material as tested. Bulk density is measured as apparent bulk density according to ASTM D1895-96 Reapproved 2010-e1, test method A.

"XS" or "xylene soluble fraction" as used in the present description means: the weight percentage (wt. %) of soluble xylene in the isolated polymer, measured according to ASTM D 5492-10.

"II Pentad", or Isotacticity Index on the pentad level, was determined by $^{13}$C NMR and the reported value represents the relative abundance of the mmmm pentad.

"d50" is used in the present description means: the mean diameter obtained by a measurement by sedimentation using a "Sedigraph" (standard AFNOR X11-683).

"Span" of the PP powder was determined according to ASTM D1921, Method A.

The present invention is described below in more detail. All embodiments described with respect to one aspect of the present invention are also applicable to the other aspects of the invention, unless otherwise stated.

DETAILED DESCRIPTION

The present invention relates to a process for preparing a procatalyst for polymerization of olefins, said process comprising contacting a magnesium-containing support with a halogen-containing titanium compound, an internal electron donor being a substituted 1,2-phenylene aromatic diester compound according to Formula A, and optionally an activator being a monoamide and/or a monoester

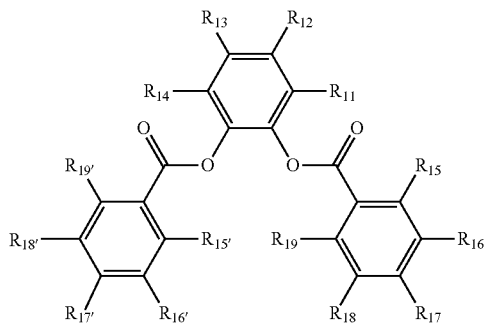

Formula A wherein in Formula A $R^{11}$, $R^{12}$, $R^{13}$, $R^{14}$, $R^{15}$, $R^{15'}$, $R^{16}$, $R^{16'}$, $R^{17}$, $R^{17'}$, $R^{18}$, $R^{18'}$, $R^{19}$, and $R^{19'}$ are the same or different; and wherein each of these R-groups is independently selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; and on the proviso that not all of R-groups may be hydrogen;

wherein said process comprises the steps of:

i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein $R^1$ and $R^4$ are independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms; wherein $X^4$ and $X^1$ are each independently a halide; z is in a range of larger than 0 and smaller than 2, being 0<z<2; x is in a range of larger than 0 and smaller than 2, being 0<x<2 to obtain a first intermediate product;

ii) optionally contacting the solid $Mg(OR^1)_x X^1_{2-x}$ obtained in step i) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; v is the valency of $M^1$; $M^2$ is a metal being Si; v is the valency of $M^2$; v is preferably 3 or 4, and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and either:

iii-1) contacting the first intermediate reaction product, obtained in step i) or the second intermediate reaction product, obtained in step ii) with the halogen-containing titanium compound and optionally the activator, and reaction of the mixture and subsequent washing of the mixture to obtain a third intermediate product;

iv) contacting the third intermediate product obtained in step iii-1) with the halogen containing titanium compound and the internal electron donor according to Formula A and reaction of the mixture to obtain a fourth intermediate product; and v) contacting the fourth intermediate product obtained in step iv) with the halogen-containing Ti-compound to obtain the procatalyst; or iii-2) contacting the first intermediate reaction product, obtained in step i) or the second intermediate reaction product, obtained in step ii) with the halogen-containing titanium compound, the internal electron donor according to Formula A and optionally the activator and reaction of the mixture at a temperature of at most 105° C. to obtain a third intermediate product; and v) contacting the third intermediate product obtained in step iii-2) with the halogen-containing titanium compound to obtain the procatalyst; or iii-3) contacting the first intermediate reaction product, obtained in step i) or the second intermediate product, obtained in step ii) with the halogen-containing titanium compound, the internal electron donor according to Formula A and optionally the activator at a temperature of at most 100° C., preferably lower than 40° C., and reaction of the mixture at a temperature of at most 115° C. to obtain a third intermediate product;

v) contacting the third intermediate product obtained in step iii-3) with the halogen-containing titanium compound to obtain the procatalyst.

Details of the Procatalyst

The Ziegler-Natta type procatalyst in the catalyst system according to the present invention is obtained by the process that is similar to the process as described in EP 2 027 164. Example I including all sub-examples (IA-IE) is incorporated into the present description. More details about the different embodiments are disclosed starting in paragraphs [0016] tot [0089]. All these embodiments related to the process and products are incorporated by reference into the present description. In the following part of the description the different steps and phases of the process for preparing the procatalyst according to the present invention will be discussed.

The process for preparing a procatalyst according to the present invention comprises the following phases: phase A): preparing a solid support for the procatalyst; phase B): optionally activating said solid support obtained in phase A using one or more activating compounds to obtain an activated solid support; phase C): contacting said solid support obtained in phase A or said activated solid support in phase B with a catalytic species wherein phase C may comprise one of the following: contacting said solid support obtained in phase A or said activated solid support in phase B with a catalytic species and one or more internal donors to obtain said procatalyst; or contacting said solid support obtained in phase A or said activated solid support in phase B with a catalytic species and one or more internal donors to obtain an intermediate product; or contacting said solid support obtained in phase A or said activated solid support in phase B with a catalytic species and an activator to obtain an intermediate product; and optionally Phase D): modifying said intermediate product obtained in phase C wherein phase D may comprise one of the following: modifying said intermediate product obtained in phase C with a Group 13- or transition metal modifier in case an internal donor was used during phase C, in order to obtain a procatalyst; modifying said intermediate product obtained in phase C with a Group 13- or transition metal modifier and an internal donor in case an activator was used during phase C, in order to obtain a procatalyst.

The procatalyst thus prepared can be used in polymerization of olefins using an external donor and a co-catalyst. The various steps used to prepare the catalyst according to the present invention are described in more detail below. The catalyst according to the present invention thus prepared can be used in polymerization of olefins using an external donor and a co-catalyst.

Phase A: Preparing a Solid Support for the Catalyst.

In the process of the present invention preferably a magnesium-containing support is used. Said magnesium-containing support is known in the art as a typical component of a Ziegler-Natta procatalyst. This step of preparing a solid support for the catalyst is the same as in the prior art process. The following description explains the process of preparing magnesium-based support. Other supports may be used. Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283222A1, EP1222214B1; U.S. Pat. Nos. 5,077,357; 5,556,820; 4,414,132; 5,106,806 and 5,077,357 but the present process is not limited to the disclosure in these documents.

Preferably, the process for preparing the solid support for the procatalyst according to the present invention comprises the following steps: step o) which is optional and step i). Step o) preparation of the Grignard reagent (optional) and Step i) reacting a Grignard compound with a silane compound. Optional step o), including many embodiments, is described in detail in WO2015091984 A1 of the same applicant, page 15 line 14 to page 16, line 28, which complete section is incorporated here by reference. Step i), including many embodiments, is described in detail in WO2015091984 A1, page 16 line 30 to page 22, line 25, which complete section is incorporated here by reference.

In another aspect a butyl Grignard (preferably BuMgCl or n-BuMgCl) is used to prepare the procatalyst composition. In another aspect a phenyl Grignard (preferably PhMgCl) is used to prepare the procatalyst composition.

An Embodiment of Step i) is:

i) contacting a compound $R^4{}_zMgX^4{}_{2-z}$ with an alkoxy- or aryloxy-containing silane compound to give a first intermediate reaction product, being a solid $Mg(OR^1)_xX^1{}_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl; $X^4$ and $X^1$ are each independently selected from the group consisting of fluoride ($F^-$), chloride ($Cl^-$), bromide ($Br^-$) or iodide ($I^-$), preferably chloride; z is in a range of larger than 0 and smaller than 2, e.g. z=1, being 0<z<2; x is in a range of larger than 0 and smaller than 2, being 0<x<2, e.g. x=1;

In other words, a process which comprises the steps of: i) contacting a compound $R^4{}_zMgX^4{}_{2-z}$ wherein $R^4$ is aromatic, aliphatic or cyclo-aliphatic group containing 1 to 20 carbon atoms, preferably butyl or phenyl, $X^4$ is a halide, and z is in a range of larger than 0 and smaller than 2, preferably 1; with an alkoxy- or aryloxy-containing silane, preferably tetraalkoxy silane (e.g. tetraethoxy silane) to give a first intermediate reaction product.

In an embodiment, said alkoxy- or aryloxy-containing silane being $Si(OR^5)_{4-n}(R^6)_n$ wherein: $R^5$ and $R^6$ are each independently selected from linear, branched or cyclic hydrocarbyl group independently selected from alkyl, alkenyl, aryl, aralkyl, alkoxycarbonyl or alkylaryl groups (preferably alkyl groups), and one or more combinations thereof; wherein said hydrocarbyl group may be substituted or unsubstituted, may contain one or more heteroatoms and preferably has from 1 to 20 carbon atoms; more preferably C1 to C4 alkyl; and n is in range of 0 to 4, preferably n is from 0 up to and including 1. In a more preferred embodiment said alkoxy- or aryloxy-containing silane being $Si(OR^5)_4$ wherein $R^5$ is C1 to C4 alkyl, most preferably all $R^5$ are ethyl, being tetraethoxy silane (TES).

Phase B: Activating Said Solid Support for the Catalyst.

This step of activating said solid support for the catalyst is an optional step that is not required, but is preferred, in the present invention. If this step of activation is carried out, preferably, the process for activating said solid support comprises the following step ii). This phase may comprise one or more stages. Step ii) relates to the activation of the solid magnesium compound and this step, including many embodiments, is described in detail in WO2015091984 A1 of the same applicant, page 23 line 3 to page 28, line 14, which complete section is incorporated here by reference. According to the present invention, the solid support and procatalyst preferably have an average particle size (or APS) of between 24-30 microns. The particle size is measured using a test method based on ASTM standard test method D4464-201.

In a further embodiment, during step ii) as activating compounds an alcohol is used as activating electron donor and titanium tetraalkoxide is used as metal alkoxide compound. More preferably a combination of ethanol and titanium tetraethoxide (TET). This embodiment is applicable to all specific embodiments discussed above.

Phase C: Contacting Said Solid Support with the Catalytic Species and Either One or More Internal Donors or an Activator.

Phase C: contacting the solid support with a catalytic species. This step can take different forms. This phase C, is described in detail in WO2015091984 A1 of the same applicant, page 28 line 15 to page 31, line 13, which complete section is incorporated here by reference. Phase C according to the present invention is amended in view of this reference. In order to increase the content of internal donor several amendments are possible to Phase C: first titanium (and optionally activator) is added to the support, reacted and washed prior to addition of the internal electron donor and/or the internal electron donor is added at a reduced addition temperature of at most 100° C. (instead of the usual 115° C.) and/or the internal donor is reacted with the other components at a reduced reaction temperature of at most 105° C. (instead of the usual 115° C.).

Preferably, the process of contacting said solid support with the catalytic species and an internal donor comprises the following step iii). This step iii) can take several forms, viz. iii)-1 to iii-7).

Step iii-1) contacting the first intermediate reaction product, obtained in step i) or the second intermediate reaction product, obtained in step ii) with the halogen-containing titanium compound and optionally the activator, and reaction of the mixture and subsequent washing of the mixture to obtain a third intermediate product;

Step iii-2) contacting the first intermediate reaction product, obtained in step i) or the second intermediate reaction product, obtained in step ii) with the halogen-containing titanium compound, the internal electron donor according to Formula A and optionally the activator and reaction of the mixture at a temperature of at most 105° C. to obtain a third intermediate product;

Step iii-3) contacting the first intermediate reaction product, obtained in step i) or the second intermediate product, obtained in step ii) with the halogen-containing titanium compound, the internal electron donor according to Formula A and optionally the activator at a temperature of at most 100° C., preferably lower than 40° C., and reaction of the mixture at a temperature of at most 115° C. to obtain a third intermediate product;

Step iii-4) contacting the first intermediate reaction product, obtained in step i) or the second intermediate reaction product, obtained in step ii) with the halogen-containing Ti-compound and optionally the activator and reaction of the mixture at a temperature of at most 105° C. and subsequent washing of to obtain a third intermediate product;

Step iii-5) contacting the first intermediate reaction product, obtained in step i) or the second intermediate reaction product, obtained in step ii) with the halogen-containing Ti-compound and optionally the activator at a temperature of at most 100° C., preferably lower than 80° C., preferably lower than 60° C. or even lower than 40° C., and reaction of the mixture at a temperature of at most 115° C., and subsequent washing of to obtain a third intermediate product;

Step iii-6) contacting the first intermediate reaction product, obtained in step i) or the second intermediate reaction product, obtained in step ii) with the halogen-containing Ti-compound, the internal electron donor according to Formula A and optionally the activator at a temperature of at most 100° C., preferably lower than 80° C., preferably lower than 60° C. or lower than 40° C., and reaction of the mixture at a temperature of at most 105° C. to obtain a third intermediate product;

Step iii-7) contacting the first intermediate reaction product, obtained in step i) or the second intermediate reaction product, obtained in step ii) with the halogen-containing Ti-compound and optionally the activator at a temperature of at most 100° C., preferably lower than 80° C., preferably lower than 60° C. or lower than 40° C., and subsequent reaction of the mixture at a temperature of at most 115° C., and subsequent washing of to obtain a third intermediate product;

The molar ratio of the internal electron donor(s) relative to the magnesium may vary between wide limits, for instance from 0.01 to 0.75. Preferably, this molar ratio is from 0.02 to 0.4; more preferably from 0.03 to 0.2. Other optional ranges are between 0.04 to 0.08; between 0.1 and 0.4 or between 0.1 and 0.3. The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5.

A step iv) may also be present, e.g. in the case that in step iii (such as steps iii-1; iii-4, iii-5; and iii-7) no internal donor is added, step iv) being the contacting of the third intermediate product obtained in step iii) with the halogen-containing Ti-compound and the internal electron donor according to Formula A. This step iv) can take several forms depending on the step iii that is carried out. In case no step iv) is present, step v) directly follows step iii).

Step iv-a) contacting the third intermediate product obtained in step iii-1) with the halogen-containing titanium compound and the internal electron donor according to Formula A and reaction of the mixture to obtain a fourth intermediate product;

Step iv-b) contacting the third intermediate product obtained in step iii-4) with the halogen-containing Ti-compound and the internal electron donor according to Formula A and reaction of the mixture at a temperature of at most 105° C., to obtain a fourth intermediate product;

Step iv-c) contacting the third intermediate product obtained in step iii-5) with the halogen-containing Ti-compound and the internal electron donor according to Formula A, at a temperature of at most 100° C., preferably lower than 40° C., and reaction of the mixture at a temperature of at most 115° C. to obtain a fourth intermediate product;

Step iv-d) contacting the third intermediate product obtained in step iii-7) with the halogen-containing Ti-compound and the internal electron donor according to Formula A, at a temperature of at most 100° C., preferably lower than 40° C., and subsequent reaction of the mixture at a temperature of at most 105° C. to obtain a fourth intermediate product;

Step v): Additional Treatment of Intermediate Product.

This step corresponds to step iv) as described in detail in WO2015091984 A1 of the same applicant, page 35 line 14 to page 37, line 14, which complete section is incorporated here by reference. It should be noted that this step v) may be carried out after step iii) or after step iv) in case a step iv) is present.

More information regarding e.g. the ratios of reaction products, weight ratio of certain components in the solid procatalyst and details regarding the procatalyst and its components are as described in WO2015091984 A1 of the same applicant (page 40 line 25 to page 41 line 23), which complete section is incorporated here by reference.

Further Embodiments

In an embodiment, $TiCl_4$ is used in step iii), iv) and/or v) as the catalytic species. This embodiment is applicable to all specific embodiments discussed above.

The procatalyst may have a titanium content of from about 0.1 wt. % to about 6.0 wt. %, based on the total solids weight, or from about 1.0 wt. % to about 4.5 wt. %, or from about 1.5 wt. % to about 3.5 wt. %. The weight ratio of titanium to magnesium in the solid procatalyst composition may be between about 1:3 and about 1:160, or between about 1:4 and about 1:50, or between about 1:6 and about 1:30. Weight percent is based on the total weight of the procatalyst composition. The magnesium to internal electron donor molar ratio may be from about 100:1 to about 1:1, or from about 30:1 to about 2:1, or from about 15:1 to about 3:1. As used herein, an "internal electron donor" or an "internal donor" is a compound added during formation of the procatalyst composition that donates a pair of electrons to one or more metals present in the resultant procatalyst composition. Not bounded by any particular theory, it is believed that the internal electron donor assists in regulating the formation of active sites thereby enhancing catalyst stereoselectivity. The internal electron donor is according to Formula A above.

Detailed Description of Activator

In a further embodiment, an activator is used selected from the group consisting of benzamides, alkylbenzoates, and mono-esters. In a further embodiment, said activator is of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

In an embodiment, a benzamide activator is present selected from the group consisting of

|  | R1 | R2 | R3 | R4 | R5 |
|---|---|---|---|---|---|
| benzamide | H | H | H | H | H |
| N-methylbenzamide | Methyl | H | H | H | H |
| N,N-dimethylbenzamide | Methyl | Methyl | H | H | H |
| N-ethylbenzamide | Ethyl | H | H | H | H |
| N,N-diethylbenzamide | Ethyl | Ethyl | H | H | H |
| N-methyl-N-ethylbenzamide | Methyl | Ethyl | H | H | H |
| 2-(trifluormethyl)benzamide | H | H | CF3 | H | H |
| N,N-dimethyl-2-(trifluormethyl)benzamide | Methyl | Methyl | CF3 | H | H |
| 3-(trifluormethyl)benzamide | H | H | H | CF3 | H |
| N,N-dimethyl-3-(trifluormethyl)benzamide | Methyl | Methyl | H | CF3 | H |
| 2,4-dihydroxy-N-(2-hydroxyethyl)benzamide | 2-hydroxyethyl | H | OH | H | OH |
| N-(1H-benzotriazol-1-ylmethyl)benzamide | 1H-benzotrialzol-1-ylmethyl | H | H | H | H |
| 1-(4-ethylbenzoyl)piperazine | Piperazine | H | H | H | Ethyl |
| 1-benzoyl piperidine | pyridine | H | H | H | H | selected from the group consisting of ethyl acetate, amyl acetate, butyl acetate, ethyl acrylate, methyl methacrylate, and isobutyl methacrylate, benzamide, methylbenzamide, dimethylbenzamide, methylbenzoate, ethylbenzoate, n-propylbenzoate, iso-propylbenzoate, n-butylbenzoate, 2-butylbenzoate, and t-butylbenzoate. In a preferred embodiment, ethyl acetate or ethyl benzoate is used as activator.

In an embodiment, an activator is present during this phase C; it may be added during any of the several stages (e.g. I, II and III). iii). The activator may be added during the same or a different stage as the internal electron donor. Several activators can be used, such as benzamide, alkylbenzoates, and monoesters. Each of these will be discussed below.

A benzamide activator has a structure according to Formula X as disclosed in WO2015091983 A1 of the same applicant, page 13, line 13-page 14, line 37, which complete section is incorporated here by reference.

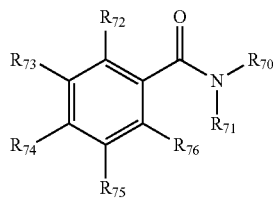

Formula X

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each A detailed description of regarding the use of alkylbenzoates as activators is to be found in WO2015091984 A1 of the same applicant, page 42 lines 1-12, which section is incorporated here by reference. More preferably, the activator is ethylbenzoate.

A detailed description of regarding the use of mono-esters as activators is to be found in WO2015091984 A1 of the same applicant, page 42 line 12—page 43, line 24, which section is incorporated here by reference.

Detailed Description of Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", as described in WO2015091984 A1 of the same applicant, page 59 line 1 to page 60 line 30, which is incorporated here by reference.

Detailed Description of External Donor

One of the functions of an external donor compound is to affect the stereoselectivity of the catalyst system in polymerization of olefins having three or more carbon atoms. Therefore it may be also referred to as a selectivity control agent. In an embodiment, the external electron donor is selected from the group, consisting of silane-containing donors, preferably selected from the group consisting of alkylamino-alkoxysilanes, alkylamino-aryloxysilanes, alkyl-alkoxysilane, alkyl-aryloxysilane, imidosilanes, and alkylimidosilanes.

The aluminum/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

External electron donors are known from: EP1538167 and EP1783145; WO2015091984 A1, page 61 line 26 to page 67 line 8; page 67, lines 9-22; page 67 line 24 to page 69 line 4, which section is incorporated here by reference. In an embodiment, the silane-compound for the external donor is dicyclopentyl dimethoxysilane, di-isopropyl dimethoxysilane (DiPDMS), di-isobutyl dimethyoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

In an embodiment, as co-catalyst a aluminum compound is used. The aluminum/external electron donor molar ratio in the polymerization catalyst system preferably is between 0.1 and 200; more preferably between 1 and 100. The external donor of the present invention may include from about 0.1 mol % to about 99.9% mol % of the silane represented by Formula I and from about 99.9 mol % to about 0.1 mol % of the additional alkoxysilane. The Si/Ti molar ratio in the catalyst system can range from 0.1 to 40, preferably from 0.1 to 20, even more preferably from 1 to 20 and most preferably from 2 to 10.

The invention also relates to the preparation of a polymerization catalyst system that comprises the procatalyst according to the invention and a co-catalyst. Preferably, the catalyst system also comprises an external electron-donating compound, also referred to as external electron donor, or simply external donor. The invention also relates to a process to make the catalyst system by contacting the several components.

Contacting the olefin with the catalyst system according to the present invention can be done under standard polymerization conditions, known to the skilled person in the art.

The olefin according to the invention may be selected from mono- and di-olefins containing from 2 to 20 carbon atoms. Suitable olefin monomers include alpha-olefins, such as ethylene, propylene, C4-C20 alpha-olefins, such as 1-butene, 1-pentene, 1-hexene, 4-methyl-1-pentene, 1-heptene, 1-octene, 1-decene, 1-dodecene and the like; C4-C20 diolefins, such as 1,3-butadiene, 1,3-pentadiene, norbornadiene, 5-vinyl-2-norbornene (VNB), 1,4-hexadiene, 5-ethylidene-2-norbornene (ENB) and dicyclopentadiene; C8-C40 vinyl aromatic compounds including styrene, o-, m- and p-methylstyrene, divinylbenzene, vinylbiphenyl, vinylnapthalene; and halogen-substituted C8-C40 vinyl aromatic compounds such as chlorostyrene and fluorostyrene.

Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butane, hexane, heptane, octene. A propylene copolymer is herein meant to include both so-called random copolymers which typically have relatively low comonomer content, e.g. up to 10 mol %, as well as so-called impact PP copolymers or heterophasic PP copolymers comprising higher comonomer contents, e.g. from 5 to 80 mol %, more typically from 10 to 60 mol %. The impact PP copolymers are actually blends of different propylene polymers; such copolymers can be made in one or two reactors and can be blends of a first component of low comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

The present invention also relates to a polyolefin, preferably a polypropylene obtained or obtainable by a process, comprising contacting an olefin, preferably propylene or a mixture of propylene and ethylene with the procatalyst according to the present invention. The terms polypropylene and propylene-based polymer are used herein interchangeable. The polypropylene may be a propylene homopolymer or a mixture of propylene and ethylene, such as a propylene-based copolymer, e.g. heterophasic propylene-olefin copolymer; random propylene-olefin copolymer, preferably the olefin in the propylene-based copolymers being ethylene. Such propylene-based (co)polymers are known to the skilled person in the art; they are also described herein above.

The propylene-based polymer may be a propylene homopolymer or a mixture of propylene and ethylene. Such propylene-based polymers are known to the skilled person in the art; they are also described herein above. Furthermore, the invention relates to a shaped article comprising the polyolefin, preferably the propylene-based polymer according to the present invention. The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

It is noted that the invention relates to all possible combinations of features recited in the claims. Features described in the description may further be combined. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The invention will be further elucidated with the following examples without being limited hereto.

EXAMPLES

Comparative Example 1

This example was carried out according to the second aspect of the invention. To a 500 mL reactor with a mechanical stirrer, $TiCl_4$ (125 mL) was added under $N_2$ outflow and heated to 100° C. while stirring at 400±20 rpm. A magnesium-containing activated support was prepare according to Example 1 (phases A and B) as disclosed in WO2015/185490 (which section is herein incorporated by reference); said support (5.5 g) in heptane (total volume=15 mL) was added to the reactor while stirring after which the reactor temperature was raised to 110° C. over a period of 10 minutes. After that, a mixture of the internal electron donor according to Formula A (ID/Mg=0.10 mol/mol, 3.80 mmol) and the activator N,N-dimethyl benzamide (5.71 mmol, BA/Mg=0.15 mol/mol) in chlorobenzene (2-3 mL) was added to the reactor. The reactor temperature was raised to 115° C. over a period of 15 minutes. The mixture was stirred at 115° C. for 105 minutes. The reaction mixture was allowed to settle and the supernatant fluid was decanted. The solid was washed with preheated (90-100° C.) chlorobenzene (125 mL) at 100° C. for 15 minutes. The reaction mixture was allowed to settle and the supernatant fluid was decanted. A mixture of preheated TiCl4 (62.5 mL) and preheated chlorobenzene (62.5 mL, both preheated to 90-100° C.) was added and the reaction mixture was stirred for 30 minutes at 115° C. The reaction mixture was allowed to settle and the supernatant fluid was decanted. The reaction mixture was allowed to settle and the supernatant fluid was decanted. This treatment with TiCl4/chlorobenzene mixture, settling and washing step was repeated one more time. The resulting solid was washed with heptane (5×100 mL) at low temperatures (removed heat source completely). The procatalyst was then dried on a glass frit using a flow of nitrogen at ambient conditions before use in polymerization.

Example 1

This example was carried out according to the first aspect of the invention.

To a 500 mL reactor with a mechanical stirrer, $TiCl_4$ (125 mL) was added under $N_2$ outflow and heated to 100° C. while stirring at 400±20 rpm. The support (5.5 g) in heptane (total volume=15 mL) was added to the reactor at 100° C. while stirring after which the reactor temperature was raised to 110° C. over a period of 10 minutes. After that, N,N-dimethyl benzamide (5.71 mmol, BA/Mg=0.15 mol/mol) in chlorobenzene (2-3 mL) was added to the reactor as activator. The reactor temperature was raised to 115° C. over a period of 15 minutes. The mixture was stirred at 115° C. for 105 minutes. The reaction mixture was allowed to settle and the supernatant fluid was decanted. The solid was washed with preheated (90-100° C.) chlorobenzene (125 mL) at 100° C. for 20 minutes. The reaction mixture was allowed to settle and the supernatant fluid was decanted. A mixture of preheated TiCl4 (62.5 mL) and preheated chlorobenzene (62.5 mL, both preheated to 90-100° C.) was added and the reaction temperature was raised to 110° C. over a period 10 minutes. After that, The internal electron donor according to Formula A (ID/Mg=0.10 mol/mol, 3.80 mmol) was added to the mixture and the mixture was stirred for 30 minutes at 115° C. The reaction mixture was allowed to settle and the supernatant fluid was decanted. A mixture of preheated TiCl4 (62.5 mL) and preheated chlorobenzene (62.5 mL, both preheated to 90-100° C.) and the mixture was stirred for 30 minutes at 115° C. The reaction mixture was allowed to settle and the supernatant fluid was decanted. This treatment with TiCl4/chlorobenzene mixture, settling and washing step was repeated three more times. The resulting solid was washed with heptane (5×100 mL) at low temperatures (removed heat source completely). The procatalyst was then dried on a glass frit using a flow of nitrogen at ambient conditions before use in polymerization.

Example 2

This example was carried out according to the second aspect of the invention. To a 500 mL reactor with a mechanical stirrer, $TiCl_4$ (125 mL) was added under $N_2$ outflow and heated to 100° C. while stirring at 400±20 rpm. A magnesium-containing activated support was prepare according to Example 1 (phases A and B) as disclosed in WO2015/185490 (which section is herein incorporated by reference); said support (5.5 g) in heptane (total volume=15 mL) was added to the reactor at a temperature of 100° C. while stirring after which the reactor temperature was raised to 105° C. over a period of 10 minutes. After that, a mixture of the internal electron donor according to Formula A (ID/Mg=0.10 mol/mol, 3.80 mmol) and the activator N,N-dimethyl benzamide (5.71 mmol, BA/Mg=0.15 mol/mol) in chlorobenzene (2-3 mL) was added to the reactor. The reactor temperature was raised to 115° C. over a period of 15 minutes. The mixture was stirred at 115° C. for 105 minutes. The reaction mixture was allowed to settle and the supernatant fluid was decanted. The solid was washed with preheated (90-100° C.) chlorobenzene (125 mL) at 100° C. for 15 minutes. The reaction mixture was allowed to settle and the supernatant fluid was decanted. A mixture of preheated TiCl4 (62.5 mL) and preheated chlorobenzene (62.5 mL, both preheated to 90-100° C.) was added and the reaction mixture was stirred for 30 minutes at 115° C. The reaction mixture was allowed to settle and the supernatant fluid was decanted. The reaction mixture was allowed to settle and the supernatant fluid was decanted. This treatment with TiCl4/chlorobenzene mixture, settling and washing step was repeated one more time. The resulting solid was washed with heptane (5×100 mL) at low temperatures (removed heat source completely). The procatalyst was then dried on a glass frit using a flow of nitrogen at ambient conditions before use in polymerization.

Using the procatalyst according to Example 1, 2 and the comparative example a polymerization experiment was carried out according to the following procedure using TEAL as the co-catalyst and using di-isobutyldimethoxysilane (diBDMS) as the external electron donor. The A/Ti ratio is 160 and the Si/Ti ratio is 11.3. The results of the procatalyst are disclosed in Table 1a and 2a below for Example 1 and 2 respectively (wherein EB arises from transesterification of the ID) and the results of the polymerization experiments are disclosed in Table 1b and 2b below for Example 1 and 2 respectively.

TABLE 1a

| Procat. | Procedure | Ti (wt %) | Mg (wt %) | Cl (wt %) | Al (ppm) | ID (wt %) | EB (wt %) | BA (wt %) | EtO⁻ (wt %) |
|---|---|---|---|---|---|---|---|---|---|
| CE | Standard 115° C. | 2.51 | 22.8 | 72.4 | 85 | 1.6 | 3.0 | 1.3 | 0.8 |
| E1 | Standard 115° C. | 2.20 | 20.2 | 64.4 | <1000 | 7.7 | 0.7 | 1.0 | 1.6 |

TABLE 1b

| Procat. | MFI (dg/min) | Yield kg/g$_{cat}$ | BD (g/L) | XS (%) | IIPent. (%) | d50 (μm) | Span |
|---|---|---|---|---|---|---|---|
| CE | 17.38 | 18.0 | 453 | 11.7 | 84.8 | 565.27 | 0.48 |
| E1 | 2.11 | 26.8 | 453 | 2.2 | 94.8 | 592.33 | 0.59 |

TABLE 2a

| Procat. | Procedure | Ti (wt %) | Mg (wt %) | Cl (wt %) | Al (ppm) | ID (wt %) | EB (wt %) | BA (wt %) | EtO⁻ (wt %) |
|---|---|---|---|---|---|---|---|---|---|
| CE | Standard 115° C. | 2.51 | 22.8 | 72.4 | 85 | 1.6 | 3.0 | 1.3 | 0.8 |
| E2 | Standard 105° C. | 2.60 | 20.3 | 65.8 | <1000 | 5.4 | 2.4 | 1.9 | 2.1 |

TABLE 2b

| Procat. | MFI (dg/min) | Yield (kg/g$_{cat}$) | Bulk Density (g/L) | XS (%) | II Pentad (%) | d50 (μm) | Span |
|---|---|---|---|---|---|---|---|
| CE | 17.38 | 18.0 | 453 | 11.7 | 84.8 | 565.27 | 0.48 |
| E2 | 3.15 | 20.7 | 385 | 2.9 | 93.7 | 645.32 | 0.44 |

CLAUSES

Clause 4: a process for preparing a procatalyst for polymerization of olefins, said process comprising contacting a magnesium-containing support with a halogen-containing titanium compound, as an internal electron donor a substituted 1,2-phenylene aromatic diester compound according to Formula A as stated above, and optionally as a activator a monoamide or monoester; wherein said process comprises the steps i) and ii) cited above and iii-4) contacting the first intermediate reaction product, obtained in step i) or the second intermediate reaction product, obtained in step ii) with the halogen-containing Ti-compound and optionally the activator and reaction of the mixture at a temperature of at most 105° C. and subsequent washing of to obtain a third intermediate product;

iv-b) contacting the third intermediate product obtained in step iii-4) with the halogen-containing Ti-compound and the internal electron donor according to Formula A and reaction of the mixture at a temperature of at most 105° C., to obtain a fourth intermediate product;

v) contacting the fourth intermediate product obtained in step iv) with the halogen-containing Ti-compound to obtain the procatalyst.

Clause 5: a process for preparing a procatalyst for polymerization of olefins, said process comprising contacting a magnesium-containing support with a halogen-containing titanium compound, as an internal electron donor a substituted 1,2-phenylene aromatic diester compound according to Formula A as stated above, and optionally as a activator a monoamide or monoester; wherein said process comprises the steps i) and ii) cited above and iii-5) contacting the first intermediate reaction product, obtained in step i) or the second intermediate reaction product, obtained in step ii) with the halogen-containing Ti-compound and optionally the activator at a temperature of at most 100° C., preferably lower than 90° C., preferably lower than 80° C., preferably higher than 50° C., such as higher than 60° C., or higher than 70 or even 80° C., and reaction of the mixture at a temperature of at most 115° C., and subsequent washing of to obtain a third intermediate product;

iv-c) contacting the third intermediate product obtained in step iii-5) with the halogen-containing Ti-compound and the internal electron donor according to Formula A, at a temperature of at most 100° C., preferably lower than 90° C., preferably lower than 80° C., preferably higher than 50° C., such as higher than 60° C., or higher than 70 or even 80° C., and reaction of the mixture at a temperature of at most 115° C. to obtain a fourth intermediate product;

v) contacting the fourth intermediate product obtained in step iv) with the halogen-containing Ti-compound to obtain the procatalyst.

In an embodiment of step iii-5) the first intermediate reaction product, obtained in step i) or the second intermediate reaction product, obtained in step ii) is reacted with the halogen-containing Ti-compound and optionally the activator at a temperature of at most 100° C., preferably lower than 90° C., preferably lower than 80° C., preferably higher than 50° C., such as higher than 60° C., or higher than 70 or even 80° C., and reaction of the mixture is carried out at a temperature of at most 100° C., preferably lower than 40° C., and subsequent washing of to obtain a third intermediate product.

Clause 6: a process for preparing a procatalyst for polymerization of olefins, said process comprising contacting a magnesium-containing support with a halogen-containing titanium compound, as an internal electron donor a substituted 1,2-phenylene aromatic diester compound according to Formula A as stated above, and optionally as a activator a monoamide or monoester; wherein said process comprises the steps i) and ii) cited above and iii-6) contacting the first intermediate reaction product, obtained in step i) or the second intermediate reaction product, obtained in step ii) with the halogen-containing Ti-compound, the internal electron donor according to Formula A and optionally the activator at a temperature of at most 100° C., preferably lower than 90° C., preferably lower than 80° C., preferably higher than 50° C., such as higher than 60° C., or higher than 70 or even 80° C., and reaction of the mixture at a temperature of at most 105° C. to obtain a third intermediate product;

v) contacting the third intermediate product obtained in step iii-6) with the halogen-containing Ti-compound to obtain the procatalyst.

Clause 7: a process for preparing a procatalyst for polymerization of olefins, said process comprising contacting a magnesium-containing support with a halogen-containing titanium compound, as an internal electron donor a substituted 1,2-phenylene aromatic diester compound according to Formula A as stated above, and optionally as a activator a monoamide or monoester; wherein said process comprises the steps i) and ii) cited above and iii-7) contacting the first intermediate reaction product, obtained in step i) or the second intermediate reaction product, obtained in step ii) with the halogen-containing Ti-compound and optionally the activator at a temperature of at most 100° C., preferably lower than 90° C., preferably lower than 80° C., preferably higher than 50° C., such as higher than 60° C., or higher than 70 or even 80° C., and subsequent reaction of the mixture at a temperature of at most 115° C., and subsequent washing of to obtain a third intermediate product;

iv-d) contacting the third intermediate product obtained in step iii-7) with the halogen-containing Ti-compound and the internal electron donor according to Formula A, at a temperature of at most 100° C., preferably lower than 90° C., preferably lower than 80° C., preferably higher than 50° C., such as higher than 60° C., or higher than 70 or even 80° C., and subsequent reaction of the mixture at a temperature of at most 105° C. to obtain a fourth intermediate product;

v) contacting the fourth intermediate product obtained in step iv) with the halogen-containing Ti-compound to obtain the procatalyst.

The invention claimed is:

1. A process for preparing a procatalyst for polymerization of olefins, said process comprising contacting a magnesium-containing support with a halogen-containing titanium compound, an internal electron donor being a substituted 1,2-phenylene aromatic diester compound according to Formula A, and optionally an activator being a monoamide and/or a monoester

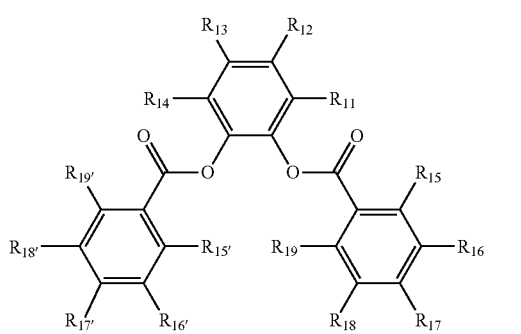

Formula A wherein in Formula A, $R_{11}$, $R_{12}$, $R_{13}$, $R_{14}$, $R_{15}$, $R_{15'}$, $R_{16}$, $R_{16'}$, $R_{17}$, $R_{17'}$, $R_{18}$, $R_{18'}$, $R_{19}$, and $R_{19'}$ are the same or different; and wherein each of these R-groups is independently hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, or combinations thereof; and with the proviso that not all of R-groups are hydrogen;

wherein said process comprises:

i) contacting a compound $R^4_z MgX^4_{2-z}$ with an alkoxy- or aryloxy-containing silane compound to give a first intermediate reaction product, being a solid Mg $(OR^1)_x X^1_{2-x}$, wherein $R^1$ and $R^4$ are each a linear, branched or cyclic hydrocarbyl group independently selected from alkyl, alkenyl, aryl, aralkyl, alkylaryl groups, and one or more combinations thereof; wherein said hydrocarbyl group is substituted or unsubstituted, optionally contains one or more heteroatoms; wherein $X^4$ and $X^1$ are each independently a halide; z is in a range of larger than 0 and smaller than 2, being $0<z<2$; x is in a range of larger than 0 and smaller than 2, being $0<x<2$ to obtain a first intermediate product;

ii) optionally contacting the solid $Mg(OR^1)_x X^1_{2-x}$ obtained in step i) with at least one activating compound selected from activating electron donors and metal alkoxide compounds of formula $M^1(OR^2)_{v-w} (OR^3)_w$ or $M^2(OR^2)_{v-w}(R^3)_w$, to obtain a second intermediate product; wherein: $M^1$ is Ti, Zr, Hf, Al or Si; v is the valency of $M^1$; $M^2$ is a metal being Si; v is the valency of $M^2$; and w is smaller than v; $R^2$ and $R^3$ are each a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted, and optionally contains one or more heteroatoms;

iii-1) contacting the first intermediate reaction product, obtained in step i) or the second intermediate reaction product, obtained in step ii) with the halogen-containing titanium compound and optionally the activator, and reaction of the mixture to obtain a crude produce of step iii-1) and subsequent washing of the crude product before the internal electron donor is added to obtain a third intermediate product;

iv-a) contacting the third intermediate product obtained in step iii-1) with the halogen-containing titanium compound and the internal electron donor according to Formula A and reaction of the mixture to obtain a fourth intermediate product; and v) contacting the fourth intermediate product obtained in step iv) with the halogen-containing Ti-compound to obtain the procatalyst.

2. The process according to claim 1, wherein step v) of contacting the fourth intermediate product is carried out more than one time with decanting to obtain a solid product in between the steps of contacting the intermediate product with the halogen-containing titanium compound.

3. The process according to claim 1, wherein an activator is present and is a monoamide, being a benzamide according to Formula B:

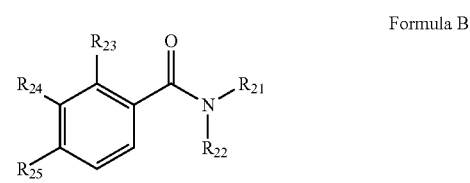

Formula B wherein in Formula B, $R_{21}$ is selected from hydrogen, methyl, ethyl, 2-hydroxyethyl, 1H-benzotriazol-1-ylmethyl, piperazine, and N-pyridine, and wherein $R_{22}$ is selected from hydrogen, methyl and ethyl, $R_{23}$ is hydrogen, hydroxyl, or trifluoromethyl, $R_{24}$ is hydrogen or trifluoromethyl, and $R_{25}$ is hydrogen, hydroxyl or ethyl.

4. The process according to claim 1, wherein the activator is present and is a monoester.

5. The process according to claim 1, wherein the compound of Formula A is 3-methyl-5-tert-butyl-1,2-phenylene dibenzoate represented by Formula A1

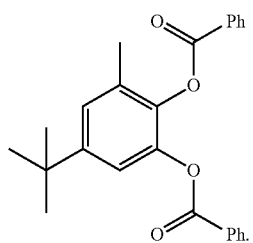

Formula A1

6. A process for preparing a catalyst system, the process comprising:
    preparing a procatalyst according to claim 1, and
    mixing the procatalyst, a co-catalyst and optionally an external electron donor to prepare the catalyst system.

7. A process for preparing a polyolefin, the process comprising:
    preparing a procatalyst according to claim 1,
    mixing the procatalyst, a co-catalyst and optionally an external electron donor to prepare a catalyst system, and
    contacting an olefin with the catalyst system to prepare the polyolefin.

8. The process according to claim 2, wherein step v) of contacting the fourth intermediate product is carried out four times with decanting to obtain a solid product in between the steps of contacting the intermediate product with the halogen-containing titanium compound.

9. The process according to claim 1, wherein the activator is present and is ethyl benzoate or N,N-dimethylbenzamide.

10. The process according to claim 1, wherein the washing of the crude product of step iii-1) is performed with preheated chlorobenzene.

11. A process for preparing a procatalyst for polymerization of olefins, said process comprising contacting a magnesium-containing support with a halogen-containing titanium compound, an internal electron donor being a substituted 1,2-phenylene aromatic diester compound according to Formula A, and optionally an activator being a monoamide and/or a monoester

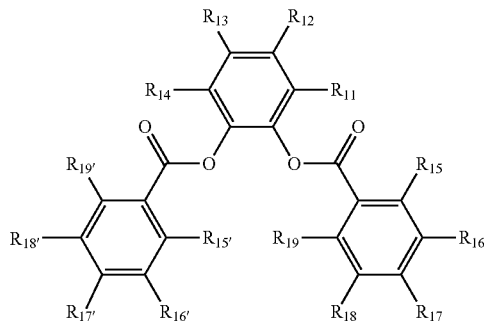

Formula A wherein in Formula A, $R_{11}$, $R_{12}$, $R_{13}$, $R_{14}$, $R_{15}$, $R_{15'}$, $R_{16}$, $R_{16'}$, $R_{17}$, $R_{17'}$, $R_{18}$, $R_{18'}$, $R_{19}$, and $R_{19'}$ are the same or different; and wherein each of these R-groups is independently selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; and with the proviso that not all of R-groups are hydrogen;
wherein said process comprises:
i) contacting a compound $R^4{}_zMgX^4{}_{2-z}$ with an alkoxy- or aryloxy-containing silane compound to give a first intermediate reaction product, being a solid Mg $(OR^1)_xX^1{}_{2-x}$, wherein $R^1$ and $R^4$ are independently a linear, branched or cyclic hydrocarbyl group independently selected from alkyl, alkenyl, aryl, aralkyl, alkylaryl groups, and one or more combinations thereof; wherein said hydrocarbyl group is substituted or unsubstituted, and optionally contains one or more heteroatoms; wherein $X^4$ and $X^1$ are each independently a halide; z is in a range of larger than 0 and smaller than 2, being 0<z<2; x is in a range of larger than 0 and smaller than 2, being 0<x<2 to obtain a first intermediate product;
ii) optionally contacting the solid $Mg(OR^1)_xX^1{}_{2-x}$ obtained in step i) with at least one activating compound selected from activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is Ti, Zr, Hf, Al or Si; v is the valency of $M^1$; $M^2$ is a metal being Si; v is the valency of $M^2$; and w is smaller than v; $R^2$ and $R^3$ are each a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted, and optionally contains one or more heteroatoms;
iii)
    iii-4) contacting the first intermediate reaction product, obtained in step i) or the second intermediate reaction product, obtained in step ii) with the halogen-containing Ti-compound and optionally the activator and reaction of the mixture at a temperature of at most 105° C. to obtain a crude product of step iii-4) and subsequent washing of the crude product of step iii-4) before the internal electron donor according to Formula A is added to obtain a third intermediate product; or
    iii-5) contacting the first intermediate reaction product, obtained in step i) or the second intermediate reaction product, obtained in step ii) with the halogen-containing Ti-compound and optionally the activator at a temperature of at most 100° C., and reaction of the mixture at a temperature of at most 115° C. to obtain a crude product of step iii-5), and subsequent washing of the crude product of step iii-5) before the internal electron donor according to Formula A is added to obtain a third intermediate product;

v) contacting the third intermediate product obtained in step iii-4) or step iii-5) with the halogen-containing Ti-compound to obtain the procatalyst.

12. The process according to claim 11, wherein the process comprises step iii-4).

13. The process according to claim 11, wherein the washing of the crude product of step iii-4) is performed with preheated chlorobenzene.

14. The process according to claim 11, wherein the process comprises step iii-5).

15. The process according to claim 13, wherein step iii-5) comprises contacting the first intermediate reaction product, obtained in step i) or the second intermediate reaction product, obtained in step ii) with the halogen-containing Ti-compound and optionally the activator at a temperature lower than 40° C., and reaction of the mixture at a temperature of at most 115° C. to obtain a crude product of step iii-5), and subsequent washing of the crude product of step iii-5) to obtain the third intermediate product.

* * * * *